United States Patent
Baillet

(10) Patent No.: US 10,203,524 B2
(45) Date of Patent: *Feb. 12, 2019

(54) TRANSPARENT OPTICAL ARTICLE HAVING A COLORLESS APPEARANCE

(71) Applicant: ESSILOR INTERNATIONAL (COMPAGNIE GENERALE D'OPTIQUE), Charenton-le-Pont (FR)

(72) Inventor: Gilles Baillet, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 108 days.

This patent is subject to a terminal disclaimer.

(21) Appl. No.: 15/107,704

(22) PCT Filed: Dec. 22, 2014

(86) PCT No.: PCT/EP2014/079074
§ 371 (c)(1),
(2) Date: Jun. 23, 2016

(87) PCT Pub. No.: WO2015/097186
PCT Pub. Date: Jul. 2, 2015

(65) Prior Publication Data
US 2016/0320636 A1 Nov. 3, 2016

(30) Foreign Application Priority Data
Dec. 23, 2013 (EP) .................................... 13306853

(51) Int. Cl.
*G02C 7/10* (2006.01)
*G02B 1/04* (2006.01)
*G02B 1/10* (2015.01)

(52) U.S. Cl.
CPC ............ *G02C 7/104* (2013.01); *G02B 1/041* (2013.01); *G02B 1/10* (2013.01); *G02C 7/108* (2013.01)

(58) Field of Classification Search
CPC ........ G02C 7/104; G02C 7/102; G02C 7/105; G02C 7/107; G02C 7/108; G02B 1/041; G02B 1/10; C08L 2666/70
USPC ........ 351/44, 159.59, 159.6, 159.66; 349/71, 349/106
See application file for complete search history.

(56) References Cited

U.S. PATENT DOCUMENTS

| | | | |
|---|---|---|---|
| 3,904,420 A | 9/1975 | Hunter | 430/8 |
| 4,211,823 A | 7/1980 | Suzuki et al. | 428/412 |
| 4,304,895 A | 12/1981 | Loshaek | 526/313 |
| 4,528,311 A | 7/1985 | Beard et al. | 524/91 |
| 4,989,967 A | 2/1991 | Matsuda | 351/159.63 |
| 5,827,614 A | 10/1998 | Bhalakia et al. | 428/411.1 |
| 5,985,389 A | 11/1999 | Dalton et al. | 428/35.7 |
| 6,328,446 B1 | 12/2001 | Bhalakia et al. | 351/159.62 |
| 6,534,443 B2 | 3/2003 | Inuzuka | 503/227 |
| 6,554,873 B2 | 4/2003 | Inuzuka et al. | 8/471 |
| 6,659,608 B2 | 12/2003 | Yamamoto et al. | 351/159.56 |
| 6,723,835 B1* | 4/2004 | Millard | C09B 29/0007 106/31.28 |
| 6,814,896 B2 | 11/2004 | Bhalakia et al. | 264/1.32 |
| 7,182,997 B2 | 2/2007 | Murschall et al. | 428/220 |
| 8,360,574 B2 | 1/2013 | Ishak et al. | 351/159.6 |
| 2003/0020869 A1 | 1/2003 | Leclaire et al. | 351/159.59 |
| 2003/0165698 A1 | 9/2003 | Vaneeckhoutte et al. | 428/447 |
| 2004/0029030 A1* | 2/2004 | Murray | G03G 8/00 430/130 |
| 2004/0258891 A1 | 12/2004 | Brennan et al. | |
| 2005/0215750 A1* | 9/2005 | Koga | C08K 5/0008 528/196 |
| 2007/0078216 A1 | 4/2007 | Cao et al. | |
| 2008/0127432 A1 | 6/2008 | Burguiere et al. | 8/507 |
| 2008/0214706 A1 | 9/2008 | Peter et al. | 524/90 |
| 2009/0047424 A1 | 2/2009 | Momma | 427/162 |
| 2009/0204186 A1 | 8/2009 | Gruber | |
| 2009/0283924 A1 | 11/2009 | Jiang et al. | 264/1.7 |
| 2009/0283926 A1 | 11/2009 | Chiu et al. | 264/1.32 |
| 2012/0184651 A1* | 7/2012 | Hurst | C08L 67/02 524/96 |
| 2013/0230649 A1 | 9/2013 | Lim et al. | 427/162 |
| 2013/0244045 A1 | 9/2013 | Song et al. | 428/447 |

(Continued)

FOREIGN PATENT DOCUMENTS

| | | |
|---|---|---|
| EP | 1497375 | 1/2005 |
| EP | 2064585 | 6/2009 |

(Continued)

OTHER PUBLICATIONS

Algvere et al., "Age-Related Maculopathy and the Impact of the Blue Light Hazard" *Acta Ophthalmo Scand.*, 84: 4-15, 2006.
Choukri et al., "White organic light-emitting diodes with fine chromaticity tuning via ultrathin layer position shifting" *Applied Physics Letters*, 89(18): 183513, 2006.
International Search Report and Written Opinion issued in PCT/EP2014/079074, dated Mar. 25, 2015.
International Search Report and Written Opinion issued in PCT/IB2013/003002, dated Aug. 26, 2014.

(Continued)

*Primary Examiner* — Jordan Schwartz
(74) *Attorney, Agent, or Firm* — Norton Rose Fulbright US LLP

(57) ABSTRACT

The present invention relates to a transparent optical article comprising at least one dye at least partially inhibiting light having a wavelength ranging from 400 to 460 nm and at least one selective optical brightener that emits light by fluorescence at a wavelength ranging from 400 to 460 nm. The optical brightener acts as a means for at least partially balancing the color imparted to the transparent optical article by the dye, thus allowing for perception of said optical article as less yellow, and even colorless to an user or an observer.

19 Claims, No Drawings

(56) References Cited

U.S. PATENT DOCUMENTS

| | | | |
|---|---|---|---|
| 2014/0252282 A1* | 9/2014 | Erkelenz | C08K 3/04 |
| | | | 252/587 |
| 2016/0101642 A1* | 4/2016 | Richert | B41M 3/14 |
| | | | 428/328 |
| 2016/0320638 A1 | 11/2016 | Jallouli et al. | |

FOREIGN PATENT DOCUMENTS

| | | |
|---|---|---|
| JP | 49065825 | 6/1974 |
| JP | H02027116 | 10/1991 |
| JP | H09503807 | 4/1997 |
| JP | 2000-241601 | 9/2000 |
| JP | 2000-314088 | 11/2000 |
| JP | 2001511716 | 8/2001 |
| JP | 2005522574 | 7/2005 |
| JP | 2009510222 | 3/2009 |
| JP | 2010501256 | 1/2010 |
| JP | 2010059340 | 3/2010 |
| JP | 2011511330 A | 4/2011 |
| WO | WO1995/010563 | 4/1995 |
| WO | WO 1997/037849 | 10/1997 |
| WO | WO2003/089519 | 10/2003 |
| WO | WO 2007/088312 | 8/2007 |
| WO | WO 2007/096066 | 8/2007 |
| WO | WO 2007/146933 | 12/2007 |
| WO | WO 2008/024414 | 2/2008 |
| WO | WO 2009/100195 | 8/2009 |
| WO | WO 2010/109154 | 9/2010 |
| WO | WO2012/098513 | 7/2012 |
| WO | WO 2012/153072 | 11/2012 |
| WO | WO2013/057074 | 4/2013 |
| WO | WO 2013/171434 | 11/2013 |
| WO | WO 2015/097186 | 7/2015 |
| WO | WO 2015/097492 | 7/2015 |

OTHER PUBLICATIONS

Kitchel, "The effects of blue light on ocular health", *Journal of Visual impairment and Blindness*, 94(6), 2000.

Office Action Issued in Corresponding Japanese Application No. 2016-542258, dated Aug. 14, 2018.

\* cited by examiner

TRANSPARENT OPTICAL ARTICLE HAVING A COLORLESS APPEARANCE

CROSS-REFERENCE TO RELATED APPLICATIONS

This application is a national phase application under 35 U.S.C. § 371 of International Application No. PCT/EP2014/079074 filed 22 Dec. 2014, which claims priority to European Patent Application No. 13306853.6 filed 23 Dec. 2013. The entire contents of each of the above-referenced disclosures is specifically incorporated by reference herein without disclaimer.

FIELD OF THE INVENTION

The present invention relates to the optics field, more particularly to a transparent optical article, preferably an ophthalmic lens, maintaining a mostly colorless appearance while comprising an optical filter intended to protect from blue light.

BACKGROUND OF THE INVENTION

Visible light as perceived by humans approximately extends over a spectrum ranging from a 380 nm wavelength to a 780 nm wavelength. The part of this spectrum, ranging from around 380 nm to around 500 nm, does correspond to a high-energy, essentially blue light.

Many studies (see for example Kitchel E., "The effects of blue light on ocular health<<, Journal of Visual Impairment and Blindness Vol. 94, No. 6, 2000 or Glazer-Hockstein and al., Retina, Vol. 26, No. 1. pp. 1-4, 2006) suggest that blue light has phototoxic effects on human eye health, and especially on the retina.

Indeed, ocular photobiology studies (Algvere P. V. and al., "Age-Related Maculopathy and the Impact of the Blue Light Hazard<<, Acta Ophthalmo. Scand., Vol. 84, pp. 4-15, 2006) and clinical trials (Tomany S. C. and al., "Sunlight and the 10-Year Incidence of Age-Related Maculopathy. The Beaver Dam Eye Study<<, Arch Ophthalmol., Vol. 122. pp. 750-757, 2004) demonstrated that an excessively prolonged or intense exposure to blue light may induce severe ophthalmic diseases such as age-related macular degeneration (ARMD).

Thus, it is recommended to limit the exposure to blue light potentially harmful, in particular as regards the wavelength band with an increased dangerousness (see especially Table B1, ISO 8980-3 standard:2003 (E) with reference to the $B(\lambda)$ blue light dangerousness function).

To that end, it may be advisable for a spectacle wearer to wear before each of both eyes an ophthalmic lens which prevents or limits the phototoxic blue light transmission to the retina. Such lenses may also provide increased visual performance due to increased contrast sensitivity.

It has already been suggested, for example in the patent application WO 2008/024414, to cut at least partially the troublesome part of the blue light spectrum from 400 nm to 460 nm, by means of lenses comprising a film partially inhibiting the light in the suitable wavelength range, through absorption or through reflection. This can also be done by incorporating a yellow dye into the optical element.

However, blocking blue light affects color balance, color vision if one looks through the optical device, and the color in which the optical device is perceived. Indeed, blue light-blocking optical devices incorporating a dye that at least partially inhibits light having a wavelength ranging from 400 to 460 nm appear yellow, brown or amber. This is esthetically unacceptable for many ophthalmic applications, and may interfere with the normal color perception of the user if the device is an ophthalmic lens.

Efforts have been made to compensate for the yellowing effect of conventional blue light blocking filters. For example, blue light blocking lenses have been treated with additional dyes, such as blue, red or green dyes, to offset the yellowing effect. However, this technique undesirably reduces the overall transmission of light wavelengths other than blue light wavelengths, which results in light attenuation for a lens user.

In view of the foregoing, there is a need for an optical article capable of at least partially blocking blue light that can further provide acceptable color cosmetics, i.e., that it is perceived as mostly colorless by someone observing the optical article. Acceptable overall level of light transmission is also needed, as well as acceptable color perception for a user, i.e., the optical article should not impair dramatically the wearer's color vision in the case of an ophthalmic system. In particular, there is a need for an optical article that allows for selective blockage of wavelengths of blue light while at the same time transmitting at least 80% of visible light.

Object of the Invention

The present inventors discovered that optical brighteners, also called fluorescent whitening agents (FWA), optical brightening agents (OBA) or fluorescent brightening agents (FBA), could be used as a color balancing means, i.e., to minimize, and preferably eliminate, the shift in color perception that results from blue-blocking by a blue light blocking dye incorporated into an optical system, as the blue light emitted by the optical brightener can compensate for the diminishing blue of the material treated by the dye and restore the original colorless appearance.

To address the needs of the present invention and to remedy to the mentioned drawbacks of the prior art, the applicant provides a transparent optical article comprising:
 at least one dye A at least partially inhibiting light having a wavelength ranging from 400 to 460 nm, preferably from 420 to 450 nm, and
 at least one optical brightener B for at least partially balancing the color imparted to the transparent optical article by the dye A, wherein said at least one optical brightener B emits light by fluorescence at a wavelength ranging from 400 to 460 nm, preferably from 420 to 450 nm, and wherein said dye A and said optical brightener B are different from each other.

The combined use of an optical brightener B and a dye A (also referred to as blue light blocking dye or yellow dye in the present specification) in the substrate and/or in at least one layer coated on the substrate of the transparent optical article simultaneously allows to protect the user from blue light and to mask the yellow color imparted by the dye.

DETAILED DESCRIPTION

As used herein, when an article comprises one or more layer(s) or coating(s) on the surface thereof, "depositing a layer or a coating onto the article" means that a layer or a coating is deposited onto the uncovered (exposed) surface of the article external coating, that is to say the coating that is the most distant from the substrate.

As used herein, a coating that is on a substrate/coating or which has been deposited "onto" a substrate/coating is defined as a coating that (i) is positioned above the substrate/ coating, (ii) is not necessarily in contact with the substrate/coating, that is to say one or more intermediate coating(s) may be interleaved between the substrate/coating and the relevant coating (however, it does preferably contact said substrate/coating), and (iii) does not necessarily completely cover the substrate/coating. When "a coating 1 is said to be located under a coating 2", it should be understood that coating 2 is more distant from the substrate than coating 1.

In the present description, an optical article is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description.

In the present invention, the transparent optical article preferably emits light whose energy source is only light-visible, ultra-violet or infra-red-entering in the transparent optical article. In other words, light emitted by the optical system is either transmitted incoming light or reflected incoming light or light re-emitted by processes of fluorescence or phosphorescence after absorption of incoming light. Actually, the transparent optical article according to the invention does preferably not comprise any electrical to optical transducers like lamps—fluorescent or incandescent—or light emitting diodes. In this embodiment, the transparent optical article is defined as being passive.

The transparent optical article according to the invention is preferably an optical lens or lens blank, more preferably an ophthalmic lens or lens blank.

The term "ophthalmic lens" is used to mean a lens adapted to a spectacle frame to protect the eye and/or correct the sight. Said lens can be chosen from afocal, unifocal, bifocal, trifocal and progressive lenses. Although ophthalmic optics is a preferred field of the invention, it will be understood that this invention can be applied to transparent optical elements of other types, such as, for example, lenses for optical instruments, filters particularly for photography or astronomy, optical sighting lenses, ocular visors, optics of lighting systems, etc.

The transparent optical article preferably comprises a substrate and at least one layer coated on the substrate. If it is an optical lens, it may be coated on its convex main side (front side), concave main side (back side), or both sides. The transparent optical article can also be a plano article. When the optical article has front and back main surfaces, its back surface is preferably not coated with any layer containing optical brighteners.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the transparent base constituent material of the optical lens and more particularly of the ophthalmic lens. This material acts as support for the stack of one or more coatings.

The substrate of the article of the invention may be a mineral or an organic glass, for instance an organic glass made from a thermoplastic or thermosetting plastic, generally chosen from transparent materials of ophthalmic grade used in the ophthalmic industry.

To be mentioned as especially preferred classes of substrate materials are polycarbonates, polyamides, polyimides, polysulfones, copolymers of polyethylene therephthalate and polycarbonate, polyolefins such as polynorbornenes, resins resulting from polymerization or (co)polymerization of alkylene glycol bis allyl carbonates such as polymers and copolymers of diethylene glycol bis(allylcarbonate) (marketed, for instance, under the trade name CR-39® by the PPG Industries company, the corresponding marketed lenses being referred to as ORMA® lenses from ESSILOR), polycarbonates such as those derived from bisphenol-A, (meth)acrylic or thio(meth)acrylic polymers and copolymers such as poly methyl methacrylate (PMMA), urethane and thiourethane polymers and copolymers, epoxy polymers and copolymers, episulfide polymers and copolymers, In some applications, it is preferred that the substrate's main surface be coated with one or more functional coating(s) to improve the optical and/or mechanical properties. The term "coating" is understood to mean any layer, layer stack or film which may be in contact with the substrate and/or with another coating, for example a sol-gel coating or a coating made of an organic resin. A coating may be deposited or formed through various methods, including wet processing, gaseous processing, and film transfer. These functional coatings classically used in optics may be, without limitation, an impact-resistant and/or adhesion primer, an abrasion-resistant and/or scratch-resistant coating, an anti-reflection coating, a polarized coating, a photochromic coating, or an antistatic coating, or a stack made of two or more such coatings, especially an impact-resistant primer coating coated with an abrasion and/or scratch-resistant coating.

Abrasion- and/or scratch-resistant coatings (hard coatings) are preferably hard coatings based on poly(meth)acrylates or silanes. Recommended hard abrasion- and/or scratch-resistant coatings in the present invention include coatings obtained from silane hydrolyzate-based compositions (sol-gel process), in particular epoxysilane hydrolyzate-based compositions such as those described in the US patent application US 2003/0165698 and in U.S. Pat. No. 4,211,823.

The primer coatings improving the impact resistance and/or the adhesion of the further layers in the end product are preferably polyurethane latexes or acrylic latexes. Primer coatings and abrasion-resistant and/or scratch-resistant coatings may be selected from those described in the application WO 2007/088312.

The antireflection coating, which improves the antireflecting properties of the final optical article by reducing the light reflection at the article-air interface over a relatively large range of the visible spectrum, may be any antireflection coating classically used in the optics field, in particular in ophthalmic optics. As is well known, antireflective coatings traditionally comprise a monolayered or a multilayered stack composed of dielectric or sol-gel materials. These are preferably multilayered coatings, comprising layers with a high refractive index (HI, n>1.5) and layers with a low refractive index (LI, n≤1.5).

The structure and preparation of antireflection coatings are described in more details in patent application WO 2010/109154 and WO 2012/153072.

Coatings such as primers, hard coats and antireflection coatings according to the invention may be deposited using methods known in the art, including spin-coating, dip-coating, spray-coating, evaporation, sputtering, chemical vapor deposition and lamination.

According to the invention, the dye A and the optical brightener B are incorporated into the transparent optical article, preferably into the substrate and/or into at least one layer coated on the substrate, together or separately, while still obtaining the advantages and benefits of the invention in terms of health and cosmetic appearance.

In systems according to the invention, the dye A and optical brightener B can be incorporated both in the substrate, both in the same coating, e.g. a primer coating, a hard coating or an antireflection coating, one in the substrate and the other in a coating deposited on either face of the transparent optical article (which may be convex, concave or flat), separately in (at least) two different coatings, or a combination of these embodiments can be implemented. For example, the blue light blocking dye may be located in a hard coating, and the optical brightener included in a primer coating, or the blue light blocking dye may be included in the substrate, and the optical brightener included in a coating. In case the dye and the optical brightener are included in (at least) two different coatings, these coatings are not necessarily deposited on the same face of the transparent optical article. They can be deposited on either face of the transparent optical article or on both faces of the transparent optical article.

Several dyes and/or several optical brighteners can be incorporated in the substrate and/or the same or different layers deposited at the surface of the substrate.

In a preferred embodiment, the transparent optical article comprises a substrate into which the blue light blocking dye A is incorporated. The dye (and/or the optical brightener) can be incorporated into the substrate by methods well known in the art, for example:

I. impregnation or imbibition methods consisting in dipping the substrate in an organic solvent and/or water based hot coloration bath, preferably a water based solution, for several minutes. Substrates made from organic materials such as organic lens substrates are most often colored in the bulk of the material by dipping in aqueous coloration baths, heated to temperatures of the order of 90° C., and in which the dye has been dispersed. The dye thus diffuses under the surface of the substrate and the color density is obtained by adjusting the quantity of dye diffusing in the body of the substrate, II. the diffusion methods described in JP 2000-314088 and JP 2000-241601, involving an impregnable temporary coating, or III. contactless coloration using a sublimable material, such as described in U.S. Pat. Nos. 6,534,443 and 6,554,873, or IV. incorporation of a blue-absorbing dye during the manufacture of the substrate itself, for example by casting or injection molding.

In another embodiment, the transparent optical article comprises a substrate and at least one layer coated on the substrate, wherein the dye A is incorporated into said at least one layer coated on the substrate. The dye may be incorporated, for example, into a hard coating and/or a primer coating, which generally promotes adhesion of the hard coating to the substrate. The dye can also be incorporated into a film that will be subsequently transferred, laminated, fused or glued to the substrate.

Several methods familiar to those practiced in the art of optical manufacturing are known for incorporating the dye (and/or the optical brightener) in a layer. The blue light blocking dye may be deposited at the same time as the layer, i.e., when the layer is prepared from a liquid coating composition, the dye can be incorporated (directly or for example as dye-impregnated particles) or dissolved in said coating composition before it is applied (in situ mixing) and hardened at the surface of the substrate.

The dye (and/or the optical brightener) may also be included in a coating in a separate process or sub-process. For example, the dye may be included in the coating after its deposition at the surface of the substrate, using a dipping coloration method similar to that referred to for coloring the substrate, i.e., by means of tinting bath at elevated temperatures, through the diffusion method disclosed in US 2003/0020869, in the name of the applicant, through the method disclosed in US 2008/127432, in the name of the applicant, which uses a printing primer that undergoes printing using an inkjet printer, through the method disclosed in US 2013/244045, in the name of the applicant, which involves printing with a sublimation dye by means of a thermal transfer printer, or though the method disclosed in US 2009/047424, in the name of the applicant, which uses a porous layer to transfer a coloring agent in the substrate. The dye may also be sprayed onto a surface before the coating is cured (e.g., thermally or UV cured), dried or applied.

When implementing ink jet printing, it is generally necessary to modify the surface of the article to receive the ink, typically by applying an ink receptive coating on the surface of the article. The ink receptive coating may be a permanent tintable coating or a temporary tintable coating being used as a temporary support from which the dyes are transferred into the article. The dyes may be transferred in the substrate itself or in a coating of the substrate, adjacent to the ink receptive coating. Ink jet printing for tinting a substrate or coating is described with more details in US 2013/0230649, in the name of the applicant.

The methods for incorporating an optical brightener B into a substrate or coating are generally the same as those disclosed for the incorporation of dyes. Obviously, combinations of several of the above described methods can be used to obtain a transparent optical article having a dye A and an optical brightener B incorporated therein.

The amount of optical brightener used in the present invention is an amount sufficient to provide a transparent optical article that does not have a yellow appearance, while the amount of dye used in the present invention is an amount sufficient to provide a satisfactory protection from blue light.

When incorporated into the substrate, the optical brightener is preferably used in an amount lower than 200 ppm relative to the weight of said substrate, more preferably lower than 50 ppm.

When incorporated into a layer coated on the substrate, the optical brightener is preferably used in an amount lower than 200 ppm relative to the weight of said layer, more preferably lower than 50 ppm.

When incorporated into the substrate, the blue light blocking dye is preferably used in an amount lower than 50 ppm relative to the weight of said substrate, more preferably lower than 5 ppm.

When incorporated into a layer coated on the substrate, the blue light blocking dye is preferably used in an amount lower than 5000 ppm relative to the weight of said layer, more preferably lower than 500 ppm.

Naturally, the respective amounts of optical brightener and blue light blocking dye have to be adapted to each other to produce a transparent, colorless element. In particular, those of skill in the art should appreciate that the desired amount of optical brightener will vary depending on several factors including the nature and amount of the dye which is used. To this end, the optimal amounts of each compound can be determined by simple laboratory experiments.

Obviously, the transparent optical article according to the invention can only appear colorless if neither of its substrate and coatings are tinted.

As used herein, a dye may refer to both a pigment and a colorant, i.e., can be soluble or insoluble in its vehicle. It may be used singly or in combination.

The chemical nature of the dye A is not particularly limited, provided that it has an absorption peak, ideally a maximum absorption peak, within the 400-460 nm range, preferably the 420-450 nm range. Preferably, dye A acting as a means for at least partially inhibiting light having a wavelength ranging from 400 to 460 nm selectively inhibits light within the 400 nm-460 nm range, and more preferably within the 420 nm-450 nm range. As used herein, a means "selectively inhibits" a wavelength range if it inhibits at least some transmission within the range, while having little or no effect on transmission of visible wavelengths outside the wavelength range.

The one or more dyes incorporated in the transparent optical article preferably absorb radiation such that they inhibits from 1 to 50% of the light having a wavelength ranging from 400 to 460 nm, more preferably from 10 to 40%, ideally from 10 to 30%. They preferably inhibit from 1 to 50% of the light having a wavelength ranging from 420 to 450 nm, more preferably from 10 to 40%, ideally from 10 to 30%. These absorptions can be controlled by dye concentration and are measured relative to the amount of light that would be transmitted at the same wavelengths in the absence of the dyes.

The blue light blocking dye may be chosen, without limitation to these families, from the perylene, coumarin, porphyrin, acridine, indolenin (which is a synonym for 3H-indole) and indol-2-ylidene families.

Preferred blue light blocking dyes have a narrow absorption band in the 400-460 nm range of the electromagnetic spectrum, preferably 420-450 nm. Ideally, said absorption band is centered around 430 nm.

The most preferred dye according to the invention is perylene, which exhibits ideal spectral characteristics and interesting injection processability properties. Indeed, perylene is a selective yellow dye, which does not absorb, or very little, in regions of the visible spectrum outside the 400-460 nm wavelength range.

As well known, optical brighteners are substances that absorb light in the UV and violet region (usually at 340-370 nm) and re-emit light by fluorescence mainly in the blue region of the visible spectrum. They may be used singly or in combination.

The chemical nature of the optical brightener is not particularly limited, provided that it is capable of emitting light by fluorescence, ideally a maximum fluorescence, at a wavelength ranging from 400 to 460 nm, preferably from 420 to 450 nm.

Preferably, the optical brightener absorbs less than 30% of the light having a wavelength ranging from 400 to 460 nm, more preferably less than 20%, even more preferably less than 10%, ideally less than 5%. It preferably absorbs less than 30% of the light having a wavelength ranging from 420 to 450 nm, more preferably less than 20%, even more preferably less than 10%, ideally less than 5%. Said optical brightener preferably has no maximum absorption peak, even better no absorption peak, within the 400-460 nm range, preferably the 420-450 nm range.

The optical brightener may be chosen, without limitation to these families, from stilbenes, carbostyrils, coumarins, 1,3-diphenyl-2-pyrazolines, naphthalimides, combined heteroaromatics (such as pyrenyl-triazines or other combinations of heterocyclic compounds such as thiazoles, pyrazoles, oxadiazoles, fused polyaromatic systems or triazines, directly connected to each other or through a conjugated ring system) benzoxazoles, in particular benzoxazoles substituted at the 2-position with a conjugated ring system, preferably comprising ethylene, phenylethylene, stilbene, benzoxazole and/or thiophene groups. Preferred families of optical brighteners are bis-benzoxazoles, phenylcoumarins, methylcoumarins and bis-(styryl)biphenyls, which are described in more details in A. G. Oertli, Plastics Additives Handbook, 6th Edition, H. Zweifel, D. Maier, M. Schiller Editors, 2009.

Specific examples of commercially available bis-benzoxazole optical brighteners are Eastobrite® compounds from Eastman Chemical, such as Eastobrite® OB, Eastobrite® OB-1 and Eastobrite® OB-3, Hostalux® compounds from Clariant, such as Hostalux ACK, Hostalux CP01, Hostalux EBU, Hostalux EF, Hostalux ERE, Hostalux EREN, Hostalux ES2R, Hostalux ESR, Hostalux ETB 300, Hostalux ETBN, Hostalux KCB, Hostalux KS, Hostalux KS1B, Hostalux KSB3, Hostalux KSC, Hostalux KSN, Hostalux NR, Hostalux NSM, Hostalux PFC, Hostalux PFCB, Hostalux PN, Hostalux PNB, and Hostalux PR, Whitefluor® compounds (styril-bis-benzoxazoles) from Sumitomo Chemical Co., such as Whitefluor® B, Whitefluor® PEN, Whitefluor® PHR, Whitefluor® HCS, Whitefluor® PCS.

Specific examples of commercially available methylcoumarin optical brighteners are Eccowhite® compounds from Eastern Color & Chemical Co., such as Eccowhite 1132 MOD, Eccowhite 2013, Eccowhite 2790, Eccowhite 5261, Eccowhite AEA-HF, Eccowhite Nylon FW, Eccowhite OP, Eccowhite PSO, Eccowhite DM-04 MOD.

Another useful category of optical brighteners is the Tinopal® family from BASF, which comprises both bis-benzoxazole and bis-(styryl)biphenyl compounds, such as Tinopal ABP-A, Tinopal ABP-X, Tinopal ASP, Tinopal BPO, TinopalEC, Tinopal HST, Tinopal HW, Tinopal MSP, Tinopal NP, Tinopal SPP-N, Tinopal SPP-Z, Tinopal UP HC DD, Tinopal UP, Tinopal CBS-X, and Tinopal OB.

Other useful optical brighteners that may be used in the present invention are described in Fluorescent Whitening agents, Anders G. EQS, Environmental quality and safety (Suppl. Vol IV) Georg Thieme Stuttgart 1975.

Preferred optical brighteners have a high fluorescence efficiency, i.e., re-emit as visible light a major proportion of the energy they have absorbed.

The most preferred optical brighteners are:

i) 2,2'-(1,2-ethylenediyldi-4,1-phenylene) bisbenzoxazole, marketed by Eastman Chemical under the trade name Eastobrite® OB-1, having the following structure:

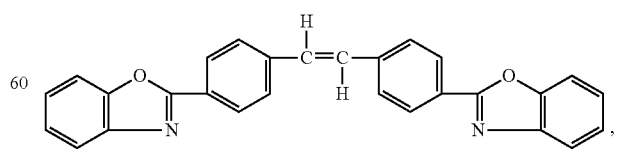

ii) 2,5-thiophenediylbis(5-tert-butyl-1,3-benzoxazole), marketed by BASF under the tradename Tinopal OB, having the following structure:

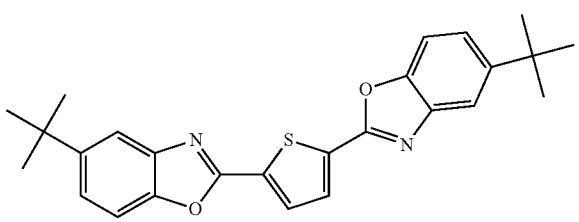 [SMILES: CC(C)(C)c1ccc2oc(-c3ccc(-c4nc5cc(C(C)(C)C)ccc5o4)s3)nc2c1]

According to the invention, a particular yellow dye is associated to an optical brightener having a fluorescence emission that will best match the absorption spectrum of said dye, and vice versa. The nature of the dye and optical brightener allow adjustment of the absorption/emission peak positions.

In a preferred embodiment, the transparent optical article according to the invention includes a dye A and an optical brightener B such that the difference (expressed in absolute value) between the maximal absorption value λmax (A) of dye a and the maximal fluorescence emission value λmax (B) of the optical brightener B is lower than 15 nm, more preferably lower than 10 nm and ideally lower than 5 nm. In the context of the present application, λmax (A) and λmax (B) are measured in dichloromethane.

The combination of perylene as a blue light blocking dye and 2,2'-(1,2-ethylenediyldi-4,1-phenylene)bisbenzoxazole (Eastobrite® OB-1) as an optical brightener is particularly preferred, because the fluorescence properties of the latter perfectly match the absorption spectrum of perylene. The wavelength of maximum fluorescence emission of Eastobrite® OB-1 is 436 nm, while perylene has an absorption maximum at 434 nm.

The transparent optical article according to the invention has improved color properties that can be quantified by the whiteness index Wi and the yellowness index Yi.

The evaluation of the whitening effect of the optical brightener B, in other words, the degree of whiteness of the inventive transparent optical article, may be carried out by means of colorimetric measurements, based on the CIE tristimulus values X, Y, Z such as described in the standards ASTM E313-73 (1993) and ASTM D 1925-70 (1988). The transparent optical article according to the invention preferably has a high whiteness index Wi, i.e., higher than 40, as measured according to ASTM E-313-73. Wi is calculated by the equation of Taube (Wi=4B-3G, the parameters B (blue) and G (green) being determined from the tristimulus values X, Y, Z with G=Y and B=0,847 Z).

The transparent optical article according to the invention preferably has a low yellowness index Yi, i.e., lower than 10, more preferably lower than 5, as measured according to ASTM D-1925. Yi can be determined from the CIE tristimulus values X, Y, Z through the relation:

$$Yi=(128X-106Z)/Y.$$

The transparent optical article according to the invention preferably has a relative light transmission factor in the visible spectrum Tv higher than 80%, more preferably higher than 85%. The Tv factor is such as defined in the standard NF EN 1836 and corresponds to the 380-780 nm wavelength range.

The invention claimed is:

1. A transparent optical lens comprising:
   at least one dye A at least partially inhibiting light transmission for at least one wavelength ranging from 400 to 460 nm; and
   at least one optical brightener B for at least partially balancing the color imparted to the transparent optical lens by the dye A, wherein the at least one optical brightener B emits light by fluorescence at at least one wavelength ranging from 400 to 460 nm, and wherein the dye A and the optical brightener B are different from each other;
   wherein the transparent optical lens has an absolute value of difference between a maximal absorption value λmax (A) of dye A and a maximal fluorescence emission value λmax (B) of the optical brightener B that is lower than 15 nm.

2. The transparent optical lens of claim 1, further defined as comprising a substrate having a weight and at least one layer coated on the substrate, wherein the at least one dye A and the at least one optical brightener B are incorporated into the substrate and/or into the at least one layer coated on the substrate, together or separately.

3. The transparent optical lens of claim 1, wherein the dye A at least partially inhibits light transmission for at least one wavelength ranging from 420 to 450 nm.

4. The transparent optical lens of claim 1, wherein the optical brightener B emits light by fluorescence at at least one wavelength ranging from 420 to 450 nm.

5. The transparent optical lens of claim 1, further defined as having a relative light transmission factor in the visible spectrum Tv higher than 80%.

6. The transparent optical lens of claim 1, wherein the dye A is a member of one of the perylene, coumarin, porphyrin, acridine, indolenin, and/or indol-2-ylidene families.

7. The transparent optical lens of claim 1, wherein the optical brightener B is one of a stilbene, carbostyril, coumarin, 1,3-diphenyl-2-pyrazoline, naphthalimide, or benzoxazole.

8. The transparent optical lens of claim 1, wherein the optical brightener B is one of a bis-benzoxazole, phenylcoumarin, methylcoumarin, or bis-(styryl)biphenyl.

9. The transparent optical lens of claim 1, wherein the at least one dye A inhibits from 1 to 50% of light transmission for at least one wavelength ranging from 420 to 450 nm.

10. The transparent optical lens of claim 2, wherein the dye A is incorporated into the substrate in an amount lower than 50 ppm relative to the weight of the substrate.

11. The transparent optical lens of claim 10, wherein the dye A is incorporated into the substrate in an amount lower than 5 ppm relative to the weight of the substrate.

12. The transparent optical lens of claim 2, wherein the dye A is incorporated into at least one layer coated on the substrate in an amount lower than 5000 ppm relative to the weight of the layer.

13. The transparent optical lens of claim 12, wherein the dye A is incorporated into at least one layer coated on the substrate in an amount lower than 500 ppm relative to the weight of the layer.

14. The transparent optical lens of claim 2, wherein the optical brightener B is incorporated into the substrate in an amount lower than 200 ppm relative to the weight of the substrate.

15. The transparent optical lens of claim 2, wherein the optical brightener B is incorporated into at least one layer coated on the substrate in an amount lower than 200 ppm relative to the weight of the layer.

16. The transparent optical lens of claim 1, further defined as having a yellowness index Yi lower than 10.

17. The transparent optical lens of claim 16, further defined as having a yellowness index Yi lower than 5.

18. The transparent optical lens of claim 1, further defined as having a whiteness index Wi higher than 40.

19. The transparent optical lens of claim 1, further defined as an ophthalmic lens.

* * * * *